(12) United States Patent
Christian

(10) Patent No.: US 6,973,080 B1
(45) Date of Patent: Dec. 6, 2005

(54) SYSTEM FOR USING INDIRECT MEMORY ADDRESSING TO PERFORM CROSS-CONNECTING OF DATA TRANSFERS

(75) Inventor: Patrick Christian, Farnham (GB)

(73) Assignee: Vegastream Limited, Bracknell (GB)

( * ) Notice: Subject to any disclaimer, the term of this patent is extended or adjusted under 35 U.S.C. 154(b) by 0 days.

(21) Appl. No.: 09/552,983

(22) Filed: Apr. 21, 2000

(30) Foreign Application Priority Data

Jan. 28, 2000 (GB) .................................... 0002062

(51) Int. Cl.[7] .......................... H04L 12/50; H04Q 11/00
(52) U.S. Cl. ...................................... 370/375; 370/428
(58) Field of Search ................................ 370/363, 366, 370/368, 371, 374–379, 381, 383, 395.7, 370/428, 389, 392, 398, 401, 422, 429; 710/52, 710/56, 20, 22, 26

(56) References Cited

U.S. PATENT DOCUMENTS

| | | | | |
|---|---|---|---|---|
| 5,841,771 A | * | 11/1998 | Irwin et al. .................. | 370/360 |
| 6,011,793 A | * | 1/2000 | Smith ....................... | 370/395.7 |
| 6,016,317 A | | 1/2000 | Sakurai et al. .............. | 370/391 |
| 6,031,842 A | * | 2/2000 | Trevitt et al. ................ | 370/412 |
| 6,160,813 A | * | 12/2000 | Banks et al. ................. | 370/422 |
| 6,185,212 B1 | * | 2/2001 | Sakamoto et al. ..... | 370/395.72 |
| 6,259,699 B1 | * | 7/2001 | Opalka et al. .............. | 370/398 |
| 6,510,161 B2 | * | 1/2003 | Trevitt et al. ............... | 370/412 |

FOREIGN PATENT DOCUMENTS

| | | |
|---|---|---|
| GB | 2 223 648 | 4/1990 |
| GB | 2 249 002 | 4/1992 |
| GB | 2 250 159 | 5/1992 |
| GB | 2 337 905 | 12/1999 |
| WO | WO 94/03021 | 2/1994 |
| WO | WO 99/03297 | 1/1999 |

* cited by examiner

Primary Examiner—Ajit G. Patel
(74) Attorney, Agent, or Firm—Wilmer Cutler Pickering Hale and Dorr LLP

(57) ABSTRACT

A data switch uses indirect memory addressing to perform switching of digital data streams in a network. Incoming data is organized into timeslots. Each timeslot's data is stored into a predefined location in buffer memory. Indirect addressing is implemented in a crosspoint address table. The addresses stored in the crosspoint address table are used to access locations in the buffer memory so that portions of words stored in the buffer memory can be combined to form an output word destined for a predetermined timeslot.

16 Claims, 1 Drawing Sheet

SYSTEM FOR USING INDIRECT MEMORY ADDRESSING TO PERFORM CROSS-CONNECTING OF DATA TRANSFERS

This application claims priority from British Patent Application No. 0002062.8 filed on Jan. 28, 2000, the disclosure of which is incorporated herein by reference for all purposes.

BACKGROUND OF THE INVENTION

This invention relates in general to digital systems and more specifically to a digital system using indirect memory addressing to perform cross-connecting of data streams.

Digital data formats are being used to represent almost every type of information imaginable. Not only are numbers, text and images represented digitally, but digital formats now include standards for voice and video. For example, standards promulgated by the International Telecommunications Union (ITU) provide standard specifications for compressing and transferring digital audio and video. The use of digital formats has distinct benefits in providing information that can be easily and accurately stored, transferred, processed and presented to human end users or electronic digital systems.

In some applications, such as telephony or video, it is desirable to provide a continuous "stream" of data in real time. This is necessary in cases where the digital data must be transferred immediately (as with telephony) or where the amount of data is so large that it is more efficient to present the data immediately as it is being received so that large buffers or other extensive storage is not necessary (as with video). Such streaming data not only needs to be transferred as quickly and as efficiently as possible, but it must be sent to particular destinations over a network. When the number of users of a network is very large, the problem of handling fast streams of data efficiently while also providing the ability to quickly and accurately deliver the streaming data to desired end users becomes complex.

The world-wide Internet has become a popular network. A great deal of effort is being focused on inventions to allow the Internet to handle streaming data while still maintaining the Internet benefits of a flexible routing scheme and the ability to massively scale to millions of users and content providers. These abilities should allow the Internet to be successfully adapted to such applications as telephony, video, three-dimensional simulation, email, or other audio and image digital data distribution applications.

However, the nature of the Internet's "Internet Protocol" (IP) and distributed routing requires that data, and data streams, be divided into many small "packets" of information. These packets of information must be directed, or switched, at near wire-speed without undue delay. Such a switching system must be extremely flexible in handling point-to-point, point-to-multipoint, or other possible permutations of data switching. Because of the distributed nature of the Internet, many such switches are required at many points so it is necessary to make the switches operate with as little resources (e.g., memory, processing power) as possible while still achieving the desired performance.

Thus, it is desirable to provide a fast, flexible switching system that efficiently handles data transfers in a network.

SUMMARY OF THE INVENTION

The present invention uses indirect memory addressing to perform switching of digital data streams in a network. Incoming data is organized into timeslots. Each timeslot's data is stored into a predefined location in buffer memory. Indirect addressing is implemented in a crosspoint address table. The addresses stored in the crosspoint address table are used to access locations in the buffer memory so that portions of words stored in the buffer memory can be combined to form an output word destined for a predetermined timeslot.

In a preferred embodiment, 32-bit words are stored in the buffer memory. The indirect addressing allows any byte of any word in the buffer memory to be accessed and used to form an outgoing 32-bit word. The system operates on clock cycles whereby a word of incoming data is stored at the beginning of each clock cycle and four addresses are fetched from the crosspoint address table and used to access four bytes of buffer data by the end of each clock cycle. Thus, there is a word of data coming in and a word of data going out on each clock cycle. Both the buffer storage and crosspoint address table are accessed sequentially.

One embodiment of the invention provides a system for transferring data from an incoming source to an outgoing destination. The system includes buffer storage coupled to the incoming source for receiving and storing data from the incoming source; a buffer storage address generator for sequentially addressing the buffer storage so that incoming data is stored sequentially within the buffer storage; an address storage including one or more addresses for accessing the buffer storage; an address storage address generator for sequentially accessing the one or more addresses stored in the address storage; and an output stage, wherein the output stage retrieves data from the buffer storage in accordance with the one or more addresses accessed by the address generator.

Another embodiment of the invention provides a method for switching digital data streams in a network where the digital data streams include timeslots. The method includes storing incoming data in a memory in accordance with the incoming data's timeslot and indirectly accessing the memory to determine which portions of the data to output.

DESCRIPTION OF THE SPECIFIC EMBODIMENTS

Figure 1:
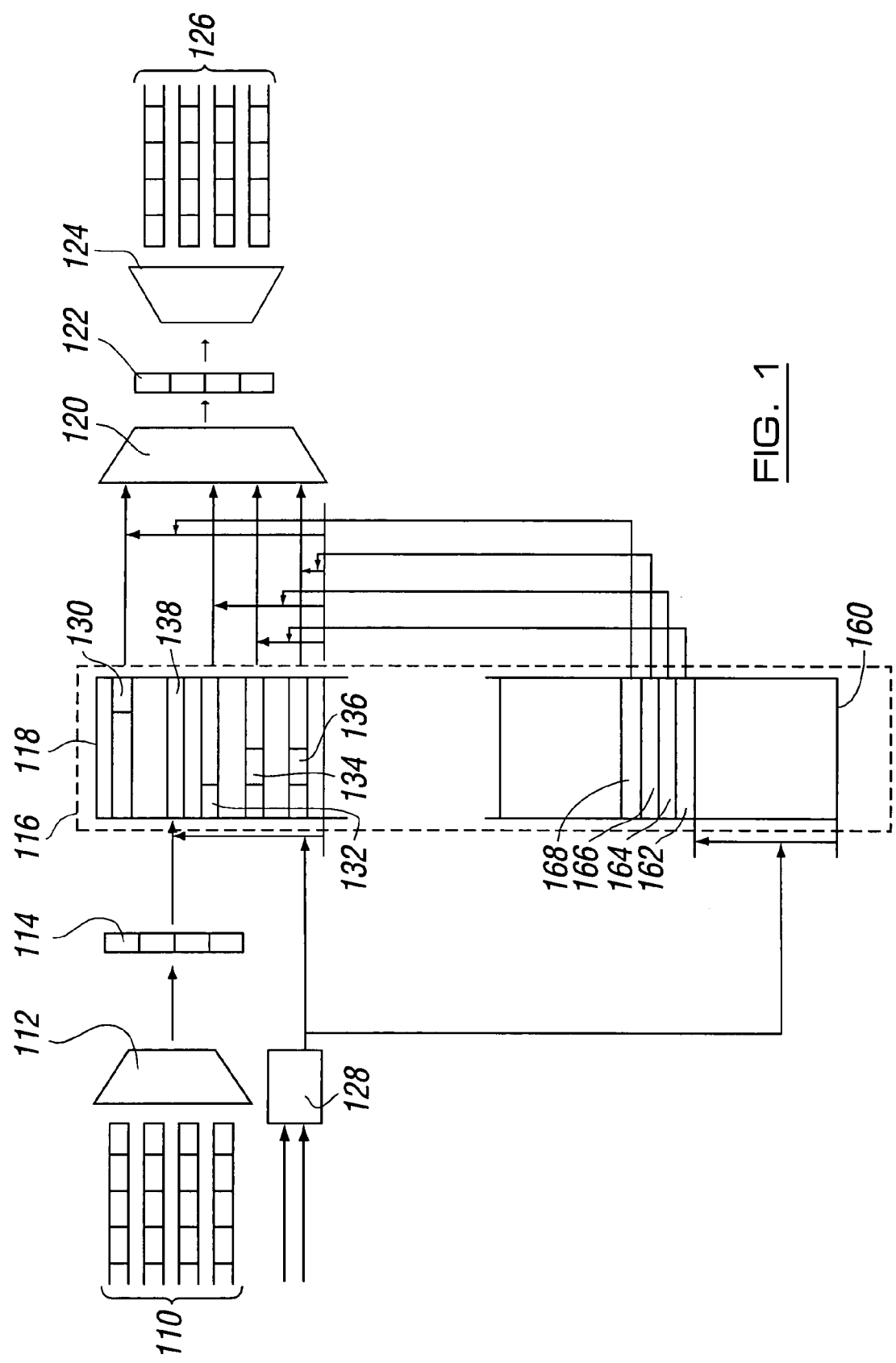
FIG. 1 is a diagram illustrating the system of the present invention.

FIG. 1 is a diagram illustrating the system of the present invention.

In FIG. 1, incoming data streams 110 can include data from one or more data streams. The data streams can be serial or parallel streams. The streams can be of varying data width. Serial to parallel converter 112 is used to form data word 114 for storage. Typically, the data output from the data streams is designed so that one 32-bit word is available in a "timeslot." A timeslot is an arbitrary interval of time for use in time-division-multiplexed (TDM) channels such as Mitel's ST-Bus. A popular mode would be to take 8 bits of data (one "byte" of data) from each of four streams in a single timeslot and to combine the bytes into a 32-bit word. Note that other input schemes are possible. The present invention is adaptable, in general, to any application where TDM or TDM-like communication channels are used.

Data word 114 is stored into buffer memory 118. In a preferred embodiment, buffer memory 118 is a subsection of total memory 116. However, any memory architecture may be used. For example, memory 118 may be an entire bank of memory on a separate integrated circuit chip, may be "virtual" memory on a hard disk drive or other media, may be arranged as any word, length; may be dual-port memory, etc.

Counter 128 generates addresses for the storage of data word 114 into buffer memory 118. In FIG. 1, data word 114 is shown being stored into location 138. Other examples of data words stored into memory 118 are shown at 130, 132, 134 and 136. Counter 128 increments sequentially, 4 bytes at a time, and is synchronized to the timeslots of the incoming data. Since the timeslot data arrives in sequence, each location in buffer memory corresponds to a single timeslot, in sequence. Thus, for example, buffer location 0 corresponds to timeslot 0, buffer location 1 corresponds to timeslot 1, and so on. Note that, where buffer storage 118 is part of a larger memory bank, a "base address" serves to define location 0 of the buffer storage. As is known in the art, an index into the buffer is used as the basis for accessing word locations in the buffer storage. With this design, each incoming data word is stored sequentially into the buffer storage and buffer storage locations correspond to timeslots.

Note that other incoming storage mappings are possible. For example, the incoming data words can be stored in descending order. The storage can be in reverse correspondence to the timeslot numbers. A hashing function can be implemented to map timeslots to arbitrary locations, words can be stored in multiple storage buffer locations, etc. In general, any suitable incoming storage mapping may be employed FIG. 1 shows crosspoint address table 160 also occupying total memory 116. As described above regarding the storage buffer, other memory architectures are possible. Crosspoint address table 160 includes pre-stored addresses for accessing bytes residing in buffer storage 118. The pre-stored addresses are typically written prior to a switching session by a host processor (not shown). The pre-stored addresses define the routing of incoming timeslot data to outgoing timeslot data. Since the addresses are byte-specific they can point to any byte in any word of buffer storage 118. Thus, an outgoing word can include any byte from any of the incoming timeslots.

On each cycle, four addresses are read from crosspoint address table 160. For example, in a given cycle, addresses 162, 164, 166 and 168 are read. These addresses reference bytes 134, 132, 136 and 130, respectively. The referenced bytes are read from storage buffer 118 and combined in byte extractor 120 to form 32-bit word 122. When it is desirable to split the outgoing data into multiple streams then parallel to serial converter 124 can be used to generate, e.g., 4 outgoing data streams 126, as shown.

Crosspoint address table 160 is accessed sequentially. In the preferred embodiment, four addresses are accessed each clock cycle, or timeslot. Naturally, any number of accesses can be employed. Also, the same options as to memory size and implementation as discussed above with respect to the buffer storage are possible.

It should be apparent that the system of the present invention can be used to arbitrarily assign any incoming data to an outgoing timeslot. Also, incoming data can be assigned to multiple outgoing timeslots. Data can be "dropped" or ignored, etc. Although the host processor in the preferred embodiment only writes to the crosspoint address table prior to the actual switching session, dynamic updating of the crosspoint address table is possible. Although the system of the present invention has been described with respect to a specific hardware configuration, many variations are possible. Components can be combined, omitted, or added. Functions can be implemented in hardware, software, or a combination of hardware and software. Incoming and outgoing data transfers need not be synchronized with each other, as where the number of outgoing timeslots differs in number from the incoming timeslots. Other variations are possible.

Although the present invention has been described with reference to specific embodiments thereof, these embodiments are merely illustrative, and not restrictive, of the invention, the scope of which is determined solely by the appended claims.

What is claimed is:

1. A system for transferring data from an incoming source to an outgoing destination, the system comprising:
    a buffer storage coupled to the incoming source for receiving and storing telephony data from the incoming source wherein the incoming data is organized into timeslots, wherein the buffer storage is organized so each timeslot corresponds to a unique word location in the buffer storage;
    a buffer storage address generator for sequentially addressing the buffer storage so that incoming data is stored sequentially within the buffer storage;
    address storage including one or more addresses for accessing the buffer storage;
    an address storage generator for sequentially accessing the one or more addresses stored in the address storage;
    a clock having a clock cycle and outputting a clock signal;
    wherein the buffer storage and address storage address generators are coupled to a signal derived from the clock signal so that a word of data is stored into the buffer storage at the start of each clock cycle and a word of data is read out from the buffer storage by the end of each clock cycle; and
    an output stage, wherein the output stage retrieves data from the buffer storage in accordance with the one or more addresses accessed by the address generator.

2. The system of claim 1, wherein a word location in the buffer storage is 32 bits in length, wherein the addresses include bits, wherein the lower-order two bits of each address are used to identify one of four bytes in a word location in the buffer storage.

3. The system of claim 2, wherein four consecutive addresses stored in the address storage are used to each identify a portion of data from one or more locations in the buffer storage.

4. A hardware switching system for routing digital data streams in a network, the hardware switching system including;
    a memory for storing incoming telephony data organized into timeslots;
    an indirect memory addressing mechanism for accessing incoming data stored in the memory including means for generating addresses for storing the incoming data into the memory, the means including a clocked counter for increments of plurality of bytes, wherein on each clock signal, data is read into and read from buffer storage; and
    an output control coupled to the indirect memory addressing mechanism for selectively outputting portions of the data in accordance with the indirect memory addressing mechanism.

5. A method for switching digital data streams in a network, wherein the digital data streams include timeslots, the method comprising:
    storing the incoming data in a memory in accordance with the timeslots; and
    indirectly accessing the memory to determine which portions of the data to output; wherein the incoming and output data is telephony data organised into multiple timeslots, the method further comprising:

the step of storing incoming data in a memory including the substep of assigning memory locations to timeslots so that incoming data in a predetermined timeslot is stored in a predetermined memory location; and the step of indirectly accessing the memory further comprising the substeps of:

using multiple addresses to access multiple memory locations wherein only a portion of each memory location is used; and combining the data in the accessed multiple memory locations to form output data to be assigned to a single timeslot.

6. The method of claim 5 stored in a machine-readable medium.

7. The system of claim 1, wherein a number of outgoing timeslots differs from a number of incoming timeslots.

8. The system of claim 7, wherein the transfer of data from the incoming source to the buffer storage is not synchronized with the transfer of data from the buffer storage to the output stage.

9. The system of claim 1, wherein the transfer of data from the incoming source to the buffer storage is synchronized with the transfer of data from the buffer storage to the output stage.

10. The method of claim 5, wherein a number of outgoing timeslots differs from a number of incoming timeslots.

11. The method of claim 10, wherein the transfer of data from the incoming source to the buffer storage is not synchronized with the transfer of data from the buffer storage to the output stage.

12. The method of claim 5, wherein the transfer of data from the incoming source to the buffer storage is synchronized with the transfer of data from the buffer storage to the output stage.

13. The system of claim 4, wherein the address generating means uses a hashing function to map timeslots to arbitrary locations.

14. The system of claim 1, wherein the transfer of data from the incoming source to the buffer storage is not synchronized with the transfer of data from the buffer storage to the output stage.

15. The method of claim 5, wherein the transfer of data from the incoming source to the buffer storage is not synchronized with the transfer of data from the buffer storage to the output stage.

16. The system of claim 1, further comprising a counter for receiving the clock signal and incrementing sequentially a plurality of bytes.

* * * * *